US012546506B2

(12) United States Patent
Jayarathne et al.

(10) Patent No.: US 12,546,506 B2
(45) Date of Patent: Feb. 10, 2026

(54) HEAT EXCHANGER ARRANGEMENT FOR HVAC SYSTEM

(71) Applicant: Johnson Controls Technology Company, Auburn Hills, MI (US)

(72) Inventors: Madhuka Manuranga Jayarathne, Wichita, KS (US); Lester Dale Sherrow, Wichita, KS (US); Rakesh Mathew, Wichita, KS (US); Rohan Bhuse, Moshi (IN)

(73) Assignee: Johnson Controls Light Commercial IP GmbH, Schaffhausen (CH)

( * ) Notice: Subject to any disclaimer, the term of this patent is extended or adjusted under 35 U.S.C. 154(b) by 954 days.

(21) Appl. No.: 17/217,891

(22) Filed: Mar. 30, 2021

(65) Prior Publication Data

US 2022/0316754 A1 Oct. 6, 2022

(51) Int. Cl.
*F24F 1/14* (2011.01)
*F24F 13/22* (2006.01)

(52) U.S. Cl.
CPC .............. *F24F 13/222* (2013.01); *F24F 1/14* (2013.01); *F24F 2013/227* (2013.01); *F24F 2221/34* (2013.01)

(58) Field of Classification Search
CPC .......................... F24F 2013/227; F24F 13/222
See application file for complete search history.

(56) References Cited

U.S. PATENT DOCUMENTS

| | | | |
|---|---|---|---|
| 6,190,163 B1* | 2/2001 | Maricic | F23D 14/04 |
| | | | 431/286 |
| 6,508,207 B2* | 1/2003 | Shellenberger | F24H 9/1836 |
| | | | 122/14.31 |
| 7,154,072 B2* | 12/2006 | Sherrill | H05B 3/16 |
| | | | 392/350 |
| 8,561,417 B1* | 10/2013 | Cantolino | H01H 29/04 |
| | | | 62/150 |
| 9,139,365 B2* | 9/2015 | Andersen | E04D 13/0409 |
| 9,316,411 B2 | 4/2016 | Sherrow et al. | |
| 9,429,338 B2* | 8/2016 | Kowald | B29C 45/18 |
| 9,459,016 B1* | 10/2016 | Kopp | B01F 23/20 |
| 9,593,865 B2 | 3/2017 | Noman et al. | |
| 9,631,877 B2 | 4/2017 | Haydock et al. | |
| 9,964,333 B2 | 5/2018 | Hanks et al. | |
| 10,006,662 B2 | 6/2018 | Haydock et al. | |
| 10,240,784 B2* | 3/2019 | Skachkov | F23G 5/24 |
| 10,317,086 B2* | 6/2019 | Acosta Herrero | F23D 14/06 |
| 10,378,780 B2* | 8/2019 | Kurosu | F24F 1/0057 |
| 10,502,454 B2* | 12/2019 | Wilson | F24H 8/006 |
| 10,584,896 B2* | 3/2020 | Wilson | C25B 1/04 |

(Continued)

OTHER PUBLICATIONS

Furnace Systems, Efficiency Heating and Cooling, 11 pages, Jan. 15, 2019.

(Continued)

*Primary Examiner* — Filip Zec
(74) *Attorney, Agent, or Firm* — Kelly McGlashen (57) ABSTRACT

A condensing heat exchanger system includes a first tube configured to receive a conditioning fluid, a second tube configured to receive the conditioning fluid from the first tube, a first vestibule panel coupled to the first tube, a second vestibule panel coupled to the second tube, and a drain trap assembly directly coupled to the second vestibule panel and configured to collect condensate.

17 Claims, 8 Drawing Sheets

(56) References Cited

U.S. PATENT DOCUMENTS

| | | | | |
|---|---|---|---|---|
| 11,333,395 B2* | 5/2022 | Block | .................. | F24F 13/222 |
| 11,761,674 B2* | 9/2023 | Jayarathne | ............ | F24F 13/222 |
| | | | | 432/90 |
| 2008/0011354 A1* | 1/2008 | Niece | ...................... | E03C 1/046 |
| | | | | 137/565.34 |
| 2008/0314375 A1* | 12/2008 | Khan | ...................... | F24H 3/087 |
| | | | | 220/571 |
| 2011/0174201 A1* | 7/2011 | Kowald | .................. | F23N 5/203 |
| | | | | 126/116 A |
| 2012/0048257 A1* | 3/2012 | Reifel | ..................... | F24H 3/087 |
| | | | | 126/112 |
| 2012/0090591 A1* | 4/2012 | Rieke | ...................... | F24H 3/087 |
| | | | | 165/95 |
| 2015/0354834 A1* | 12/2015 | Barone | ................. | F24H 15/345 |
| | | | | 431/2 |
| 2015/0369495 A1* | 12/2015 | Maricic | .................. | F23D 14/58 |
| | | | | 126/104 A |
| 2016/0216004 A1* | 7/2016 | Bruton | .................. | F24H 9/1881 |
| 2016/0216005 A1* | 7/2016 | Bruton | .................. | F24H 9/1881 |
| 2017/0045282 A1* | 2/2017 | Thornberry, Jr. | ...... | F15D 1/0025 |
| 2017/0157527 A1* | 6/2017 | Kopel | .................. | B01D 5/0051 |
| 2018/0259223 A1* | 9/2018 | Reed | ..................... | F24H 15/254 |

OTHER PUBLICATIONS

Heat Exchanger Assembly Rear View, Distributor Technical Training, Carrier, slide 84, 2016, https://slideplayer.com/slide/5982611.

Carrier Heat Exchanger Failure, Furnace & AC Experts, 7 pages, Feb. 6, 2018, https://www.furnaceacexperts.ca/heat-exchanger-failures-warranty-program/.

Daikin Products, J.C. Robinson & Sons, 3 pages, Apr. 14, 2015, https://www.jcrobinson.com/daikin-products/.

* cited by examiner

HEAT EXCHANGER ARRANGEMENT FOR HVAC SYSTEM

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. In some embodiments, the HVAC system may include a heat exchanger through which the refrigerant may flow, and the HVAC system may include a fan configured to direct the supply air flow across the heat exchanger to exchange heat with the refrigerant. Unfortunately, certain components of the HVAC system may be affected by condensate formed during operation of the HVAC system. Further, it may be difficult to access certain sections of the HVAC system, such as to perform maintenance on the HVAC system.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a condensing heat exchanger system includes a first tube configured to receive a conditioning fluid, a second tube configured to receive the conditioning fluid from the first tube, a first vestibule panel coupled to the first tube, and a second vestibule panel coupled to the second tube, and a drain trap assembly directly coupled to the second vestibule panel and configured to collect condensate.

In an embodiment, a furnace includes a first heat exchanger tube and a second heat exchanger tube fluidly coupled to one another, a first vestibule panel configured to couple to the first heat exchanger tube, a second vestibule panel configured to couple to the second heat exchanger tube, and a drain trap assembly directly mounted to the second vestibule panel and configured to collect liquid formed within the furnace during operation of the furnace. The first vestibule panel and the second vestibule panel are each removably coupled to and individually removable from the furnace.

In an embodiment, a heat exchanger system includes a first heat exchanger section having a first vestibule panel and a first tube coupled to the first vestibule panel at an inlet of the first tube. The first tube is configured to direct a fluid therethrough and transfer heat from the fluid to an air flow directed through the heat exchanger system. The heat exchanger system also includes a second heat exchanger section having a second vestibule panel and a second tube coupled to the second vestibule panel at an outlet of the second tube. The second tube is fluidly coupled to the first tube, the second tube is configured to receive the fluid from the first tube, to direct the fluid therethrough, and to transfer heat from the fluid to the air flow directed through the heat exchanger system, and the first vestibule panel and the second vestibule panel are separate components. The heat exchanger system further includes a drain trap assembly coupled to the second vestibule panel and forming a cavity. The second tube of the second heat exchanger system extends into the cavity.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a vapor compression circuit that circulates a refrigerant for conditioning a supply air flow. The HVAC system may deliver the conditioned supply air flow to a space to condition the space. For example, the vapor compression circuit may include a heat exchanger configured to receive the refrigerant, and the HVAC system may include a fan configured to direct the supply air flow across the heat exchanger to cause the supply air flow to exchange heat with the refrigerant (e.g., to heat or cool the supply air flow). The supply air flow may then be directed into the space to condition the space. Additionally or alternatively, the HVAC system may include a furnace (e.g., a condensing furnace) configured to heat the supply air flow. The furnace may include another heat exchanger, which may include tubing that is configured to receive heated combustion products (e.g., flue gas). The furnace may also include a blower configured to direct the supply air flow across the tubing, thereby placing the supply air flow in a heat exchange relationship with the heated combustion products to heat the supply air flow. Thereafter, the heated supply air flow may be directed into the space to heat the space.

In some circumstances, condensate may form during operation of the HVAC system. For example, in the heat exchanger of the furnace, the supply air flow may cause the combustion products to cool and cause moisture contained within the combustion products to condense. Contact between the condensate and certain components of the furnace, such as certain parts of the heat exchanger, may be undesirable. Furthermore, in some embodiments, it may be difficult to access certain parts of the HVAC system, such as an interior volume of the furnace. For instance, a geometry or an orientation of the heat exchanger within the furnace may block or restrict access to a volume within the furnace.

Thus, it is presently recognized that improved operation and/or accessibility of a heat exchanger or a heat exchanger system of the HVAC system is desirable. In accordance with embodiments of the present disclosure, a heat exchanger system includes a primary heat exchanger (e.g., a first tube) that is fluidly coupled to a secondary heat exchanger (e.g., a second tube). The primary heat exchanger may be configured to couple to a first vestibule panel, and the secondary heat exchanger may be configured to couple to a second vestibule panel that is separate from or removably coupled to the first vestibule panel. The first vestibule panel and the second vestibule panel may be coupled to a portion (e.g., a cabinet, an enclosure) of the HVAC system to secure the heat exchanger system within the HVAC system. In some circumstances, condensate may form within or be directed to the secondary heat exchanger during operation of the heat exchanger system. For this reason, the second vestibule panel may be made of a material that is unaffected and/or resistant to degradation caused by contact with the condensate. Further, the second vestibule panel may be sized to block or reduce contact between the condensate and the first vestibule panel and/or otherwise reduce contact between the condensate and other components of the heat exchanger system. In addition, the first vestibule panel and the second vestibule panel may be individually decoupled and removed from the HVAC system to enable improved access to components of the HVAC system. For example, the second vestibule panel may be decoupled and removed from the HVAC system without decoupling and removing other components (e.g., the first vestibule panel) of the heat exchanger system from the HVAC system. However, the heat exchanger system may be configured to enable removal of various components, such as the primary heat exchanger and/or the secondary heat exchanger, after removal of the second vestibule panel. Thus, the arrangement of the first vestibule panel and the second vestibule panel may improve the ease of disassembly of the heat exchanger system and/or the ease of access to the HVAC system.

Further still, the heat exchanger system may include a drain trap assembly that is coupled (e.g., fluidly coupled) to one of the vestibule panels, such as to the second vestibule panel. The drain trap assembly may receive and/or capture condensate formed during operation of the heat exchanger system. For example, the drain trap assembly may block the condensate from being directed to and/or contacting certain parts of the HVAC system. In some embodiments, the drain trap assembly may be directly secured or mounted to the second vestibule panel. That is, the drain trap assembly may be coupled to the second vestibule panel without intervening components, such as a protective sheet, positioned between the second vestibule panel and the drain trap assembly, thereby reducing a number of components and/or a cost included in the manufacture of the heat exchanger system. Further, a fan (e.g., a draft inducer blower) may direct combustion products to flow through the tubing of the heat exchanger (e.g., of the primary heat exchanger, of the secondary heat exchanger). Tubing of the secondary heat exchanger may extend into a cavity of the drain trap assembly, which may improve efficiency of the fan in directing the combustion products through the heat exchanger system. In this way, the heat exchanger system may more efficiently heat the supply air flow.

Figure 1:
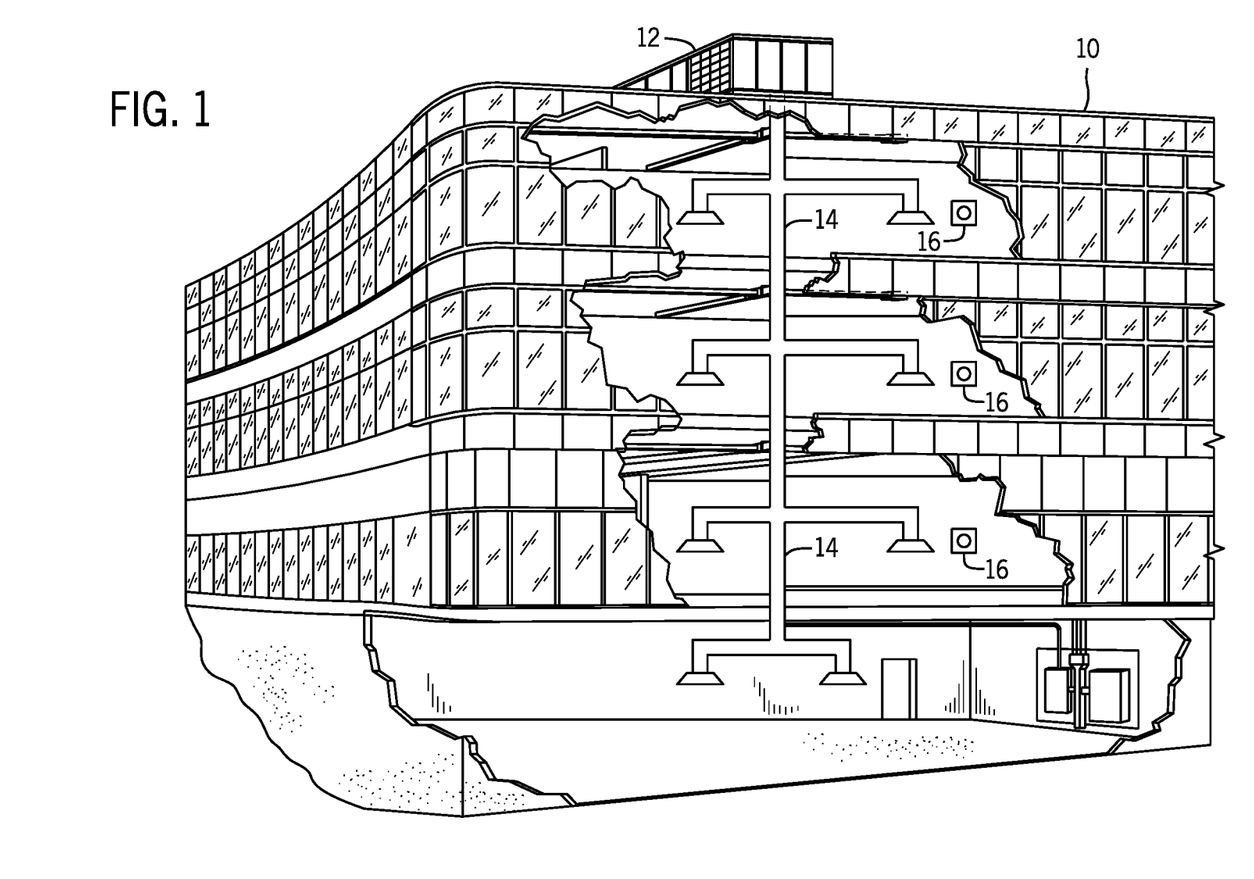
FIG. 1 is a perspective view of an embodiment of a heating, ventilation, and/or air conditioning (HVAC) system for environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
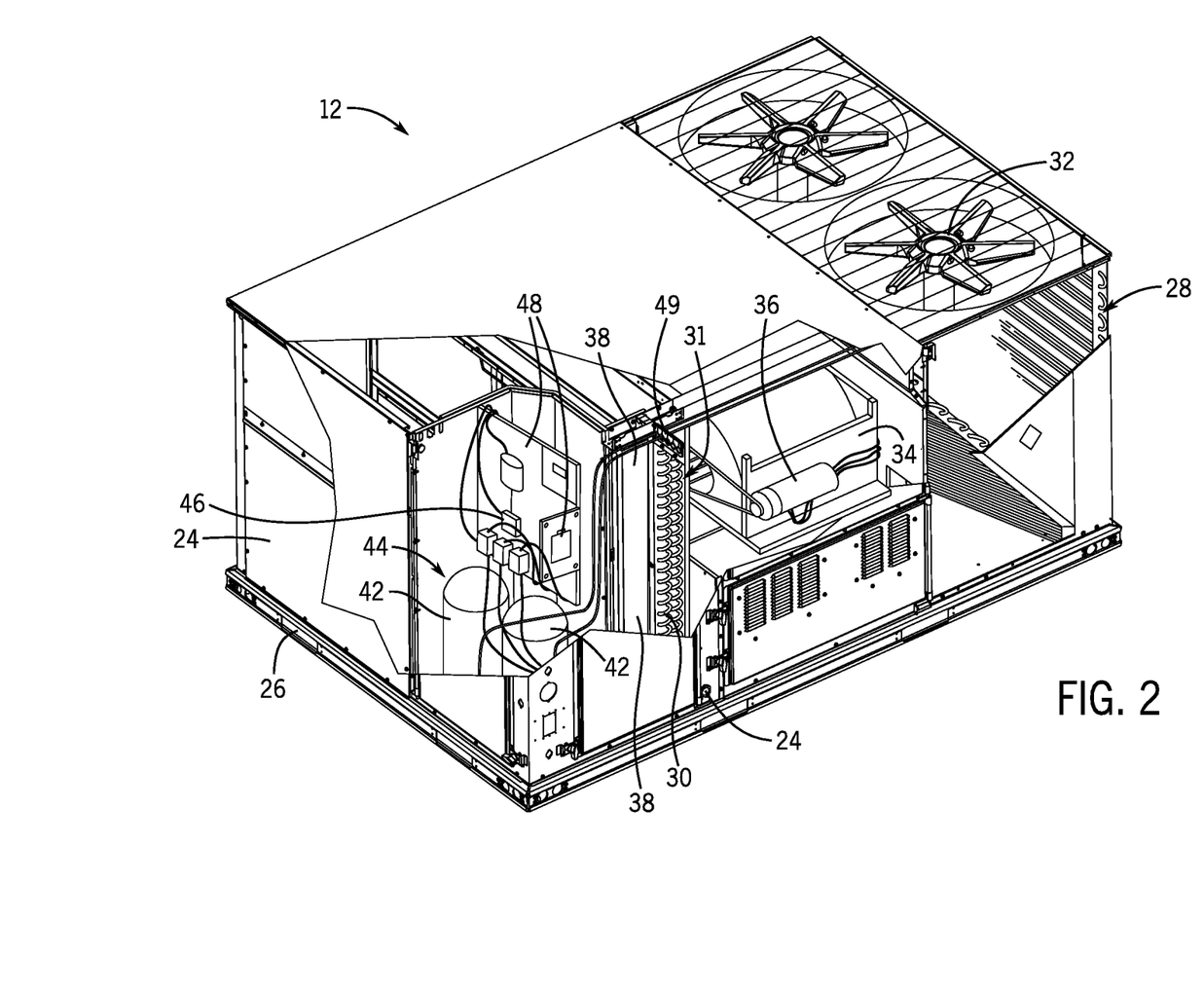
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
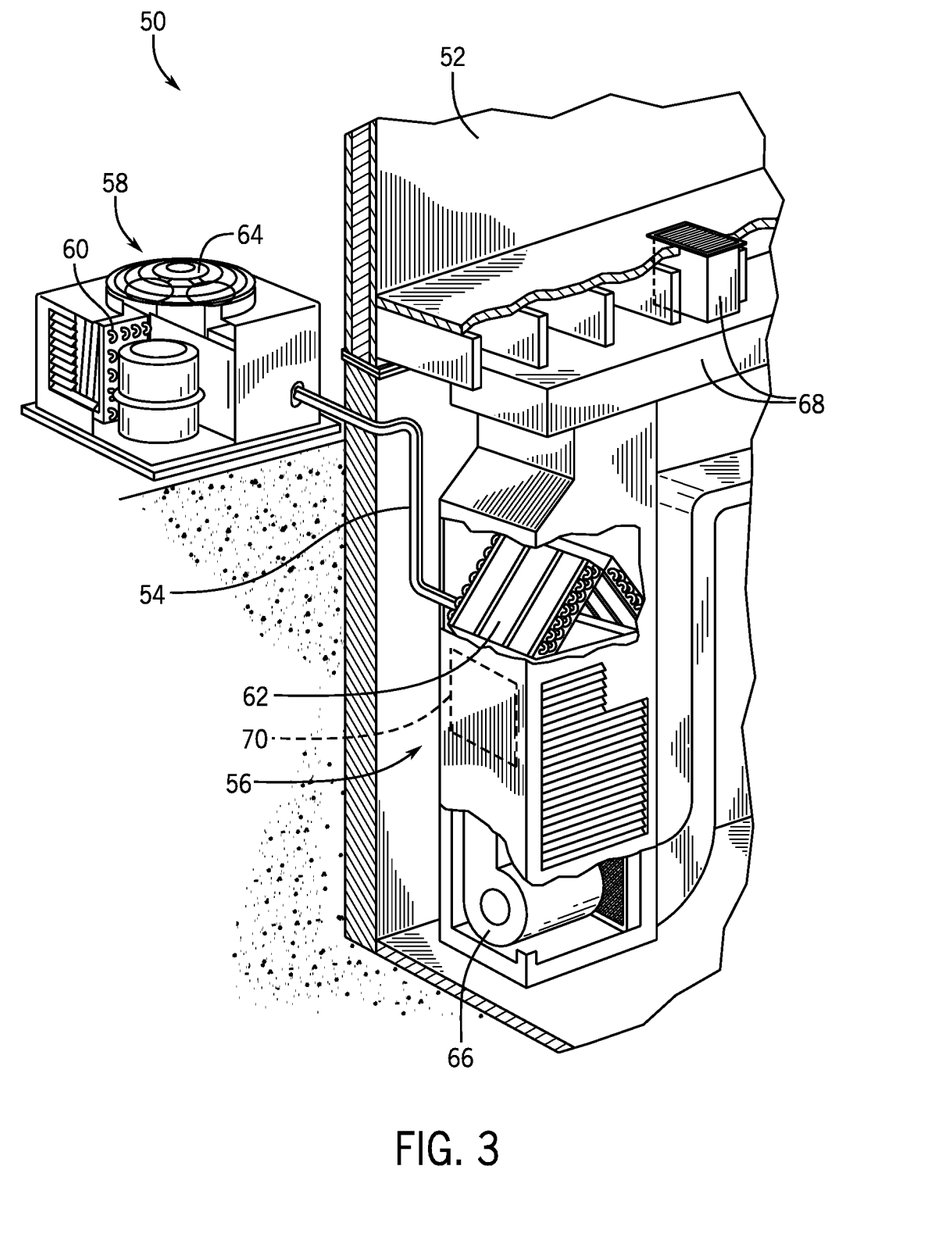
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
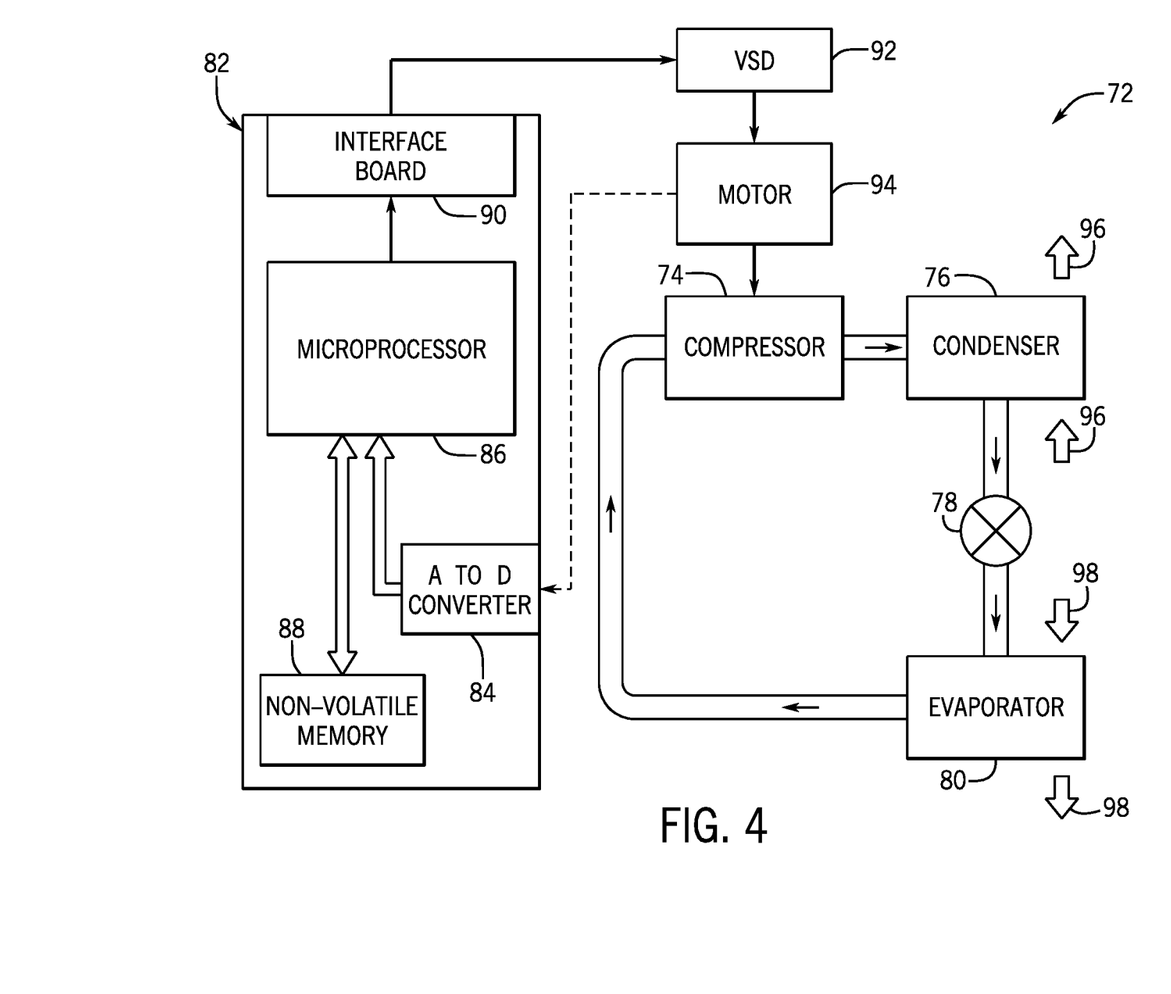
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to a heat exchanger system that may be incorporated in an HVAC system, such as the HVAC unit 12 or the residential heating and cooling system 50. The heat exchanger system may include a primary heat exchanger and a secondary heat exchanger that are fluidly coupled to one another. As used herein, the primary heat exchanger receives a conditioning fluid (e.g., combustion products) from a source (e.g., a flame, a burner assembly), and the secondary heat exchanger receives the conditioning fluid from the primary heat exchanger and discharges the conditioning fluid out of the heat exchanger system. For example, the conditioning fluid may be a gaseous substance (e.g., combustion products), and the heat exchanger may include a fan configured to direct the conditioning fluid from the secondary heat exchanger to an ambient environment. Indeed, the primary heat exchanger and the secondary heat exchanger may each include tubing that is fluidly coupled in a series flow arrangement, and the fan may draw the combustion products sequentially through the tubing of the primary heat exchanger, through the tubing of the secondary heat exchanger, and then force the combustion products out of the heat exchanger system.

The tubing of the primary heat exchanger may be coupled to a first vestibule panel, the tubing of the secondary heat exchanger may be coupled to a second vestibule panel, and the first vestibule panel and the second vestibule panel may be secured to one another and/or within the HVAC system (e.g., to a cabinet, to an enclosure) to secure the heat exchanger system within the HVAC system. In some circumstances, liquid condensate may be formed within the tubing of the secondary heat exchanger and/or of the primary heat exchanger. The condensate may be directed out of the secondary heat exchanger system via a drainage system of the heat exchanger system, which may include a drain trap, a drain line, a drain pan, and the like. The arrangement of the first vestibule panel and the second vestibule panel may block the condensate from undesirably contacting the first vestibule panel, thereby blocking the condensate from affecting or disturbing the first vestibule panel (e.g., causing wear of the first vestibule panel). Furthermore, the second vestibule panel may be separately and removably coupled to the HVAC system to enable decoupling and removal of the second vestibule panel from the HVAC system without also decoupling and removing the first vestibule panel from the HVAC system. For example, during maintenance of the HVAC system (e.g., of the heat exchanger system), the second vestibule panel may be decoupled and removed to enable access to an interior volume of the HVAC system or heat exchanger system, while the first vestibule panel and/or the heat exchanger system may remain coupled within the HVAC system. In this manner, the arrangement of the first vestibule panel and the second vestibule panel may improve accessibility of interior volumes or components of the HVAC system. Although the primary disclosure discusses the use of the heat exchanger system as a furnace of the HVAC system, the heat exchanger system may be incorporated in any suitable section of the HVAC system.

Figure 5:
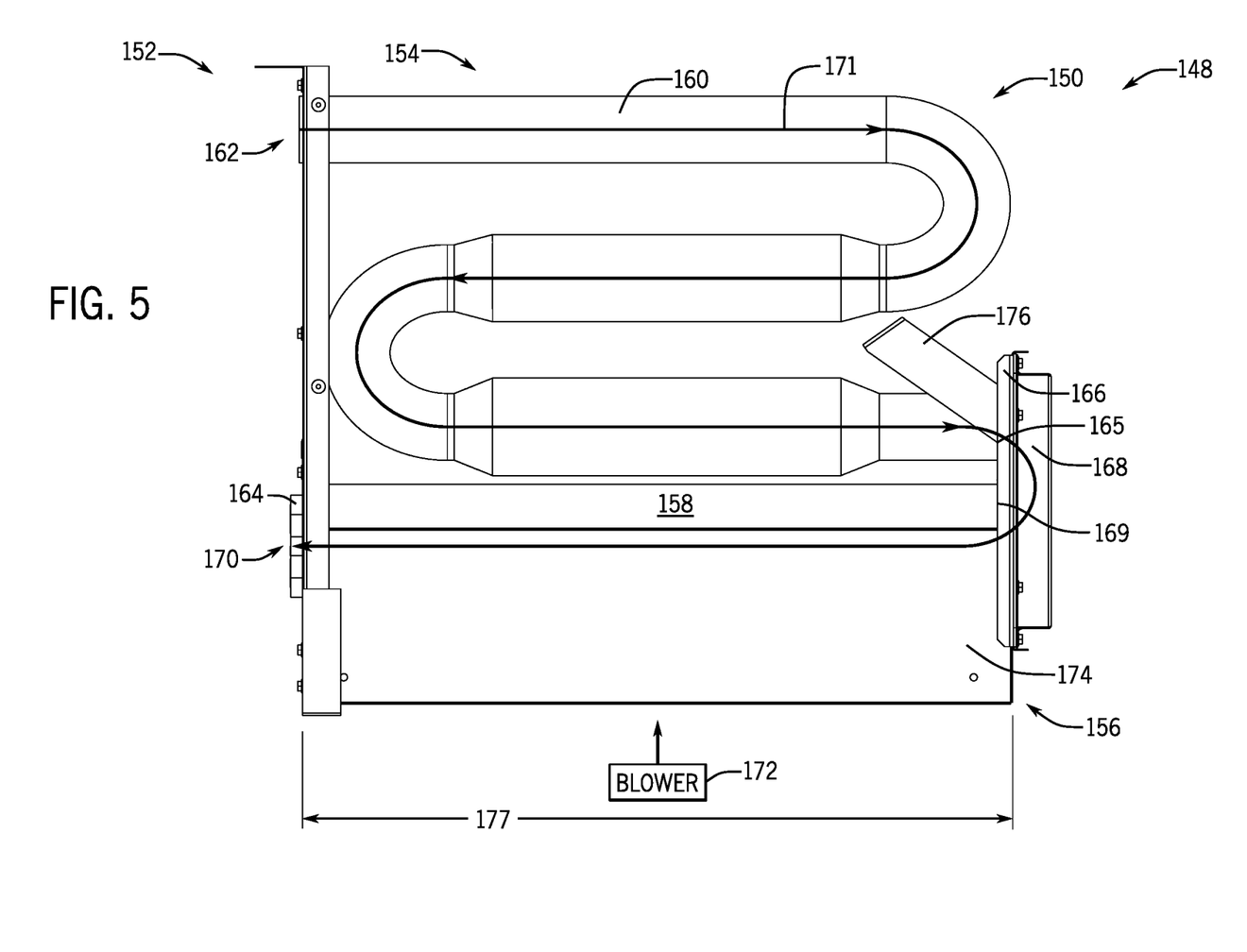
FIG. 5 is a side view of an embodiment of a heat exchanger system having separate vestibule panels, in accordance with an aspect of the present disclosure.

With the preceding in mind, FIG. 5 is a side view of an embodiment of an HVAC system 148 having a heat exchanger system 150 (e.g., a condensing heat exchanger system). For example, the heat exchanger system 150 may be a part of a furnace (e.g., a single stage furnace, a multi-stage furnace) of the HVAC system 148 for heating a space serviced by the HVAC system 148. The heat exchanger system 150 may include a primary heat exchanger section 152 having a primary heat exchanger 154 and a secondary heat exchanger section 156 having a secondary heat exchanger 158. The primary heat exchanger 154 may include a set of primary tubes or primary heat exchanger tubes 160 that are configured to receive combustion products from a heat source (not shown), such as a burner and/or a flame. By way of example, each of the primary tubes 160 may include an inlet 162 through which the combustion product is directed into the respective primary tube 160. Furthermore, the secondary heat exchanger 158 may include a set of secondary tubes or secondary heat exchanger tubes 164 that are fluidly coupled to the set of primary tubes 160 of the primary heat exchanger 154. For instance, each of the primary tubes 160 may include an outlet 165 coupled to an end plate 166 that is further coupled to a cover 168 (e.g., an end cover). The arrangement of the end plate 166 and the cover 168 may cooperatively define a compartment in which the combustion products are discharged via the outlet(s) 165 of the primary tube(s) 160. Further, each of the secondary tubes 164 may include an inlet 169 coupled to the end plate 166 and configured to receive combustion products discharged from the outlet(s) 165 of the primary tube(s) 160 and directed through the compartment to transition from the set of primary tubes 160 to the set of secondary tubes 164. Additionally, each of the secondary tubes 164 may include an outlet 170 that may direct the combustion products out of the heat exchanger system 150 (e.g., out of HVAC system). By way of example, in certain embodiments, a fan (not shown), such as a draft inducer blower, may be fluidly coupled to the outlets 170 of the set of secondary tubes 164 and also to an exhaust conduit that directs the combustion products out of the heat exchanger system. The fan may draw the combustion products in a direction 171 that flows sequentially through the set of primary tubes 160, through the set of secondary tubes 164, and into the exhaust conduit to discharge the combustion products away from the heat exchanger system (e.g., into an ambient environment fluidly coupled to the exhaust conduit).

In the illustrated embodiment, the set of primary tubes 160 may be larger than the set of secondary tubes 164. For instance, each tube of the set of primary tubes 160 may have a larger cross sectional area (e.g., flow path area) relative to that of each tube of the set of secondary tubes 164. In additional or alternative embodiments, the set of primary tubes 160 may be smaller than the set of secondary tubes 164 and/or may be of approximately the same size as the set of secondary tubes 164. In some embodiments, the cumulative flow path area of the set of primary tubes 160 may be approximately equal to the cumulative flow path area of the set of secondary tubes 164.

During operation of the heat exchanger system 150, a blower 172 may direct an air flow, such as a supply air flow, across the secondary heat exchanger 158 (e.g., across the set of secondary tubes 164) and then across the primary heat exchanger 154 (e.g., across the set of primary tubes 160). The air flow may exchange heat with the combustion products flowing through the set of secondary tubes 164, thereby heating the air flow, and then with the combustion products flowing through the set of primary tubes 160, thereby further heating the air flow. In this way, each of the primary heat exchanger 154 and the secondary heat exchanger 158 may heat the air flow. In certain embodiments, the heat exchanger system 150 may include a baffle or vent 174 positioned at the secondary heat exchanger section 156, such as underneath the secondary heat exchanger 158. The baffle 174 may receive the air flow from the blower 172 and may guide the air flow across the set of secondary tubes 164 to increase an amount of the air flow that contacts the set of secondary tubes 164 and exchanges heat with the combustion products flowing through the set of secondary tubes 164, thereby improving an efficiency of the secondary heat exchanger 158. The heat exchanger system 150 may also include a baffle 176 (e.g., a baffle plate) that may guide the air flow across the set of primary tubes 160 to increase an amount of the air flow that contacts the set of primary tubes 160 and exchanges heat with the combustion products flowing through the set of primary tubes 160, thereby improving an efficiency of the primary heat exchanger 154. In the illustrated embodiment, the baffle 176 extends obliquely from the end plate 166 toward the set of primary tubes 160 (e.g., toward the inlet 162 of the set of primary tubes 160) such that air flow directed across the secondary heat exchanger 158 is diverted toward the set of primary tubes 160. In additional or alternative embodiments, the baffle 176 may be positioned and/or oriented in a different manner and/or the heat exchanger system 150 may include other components that guide the air flow across the set of primary tubes 160, the set of secondary tubes 164, or both, to improve an efficiency of the heat exchanger system 150 to heat the air flow.

In some embodiments, each tube of the set of primary tubes 160 and/or the set of secondary tubes 164 may define multiple passes. That is, each tube of the set of primary tubes 160 and/or the set of secondary tubes 164 may traverse a length 177 of the heat exchanger system 150 multiple times. Incorporating multiple passes in the set of the primary tubes 160 and/or of the set of the secondary tubes 164 may increase an efficiency of the heat exchanger system 150 to heat the air flow. Indeed, each pass may provide additional surface area with which the air flow may contact to enable further heating of the air flow via the combustion products. Although the illustrated set of primary tubes 160 includes three passes, the set of primary tubes 160 and/or the set of secondary tubes 164 may include any suitable number of passes, such as two passes or more than three passes. In additional or alternative embodiments, each tube of the set of primary tubes 160 and/or the set of secondary tubes 164 may define a single pass.

Further, during operation of the heat exchanger system 150, heat transferring from the combustion products to the air flow causes the combustion products to be cooled during the flow through the primary heat exchanger 154 (e.g., through each pass of the set of primary tubes 160) and further cooled during the flow through the secondary heat exchanger 158. In some circumstances, the additional cooling of the combustion products within the secondary heat exchanger 158 may cause moisture within the combustion products to condense, thereby forming liquid condensate within the secondary heat exchanger 158 (e.g., within the set of secondary tubes 164, within the set of primary tubes 160). The flow of combustion products within the set of secondary tubes 164 may also cause at least some of the condensate to flow along the secondary heat exchanger 158, such as toward the outlet 170 of the set of secondary tubes 164. For this reason, the heat exchanger system 150 may include a drainage system configured to remove the condensate from within the secondary heat exchanger 158 to avoid undesirable flow of the condensate to other parts of the HVAC system 148 (e.g., out of the outlet 170), to avoid condensate blocking the flow of combustion products through the secondary heat exchanger 158, and/or to mitigate wear and structural changes of heat exchanger system 150 components via the condensate. As an example, the heat exchanger system 150 may include drain lines fluidly coupled to the outlets 170 of the set of secondary tubes 164 to direct the condensate out of the set of secondary tubes 164, a drain trap that collects condensate to block air flow into and/or out of the set of secondary tubes 164, a drain pan that accumulates condensate discharged out of the heat exchanger system 150, and so forth. Indeed, the drainage system may block the condensate from undesirably contacting other parts of the heat exchanger system 150, such as components of the first heat exchanger section.

Figure 6:
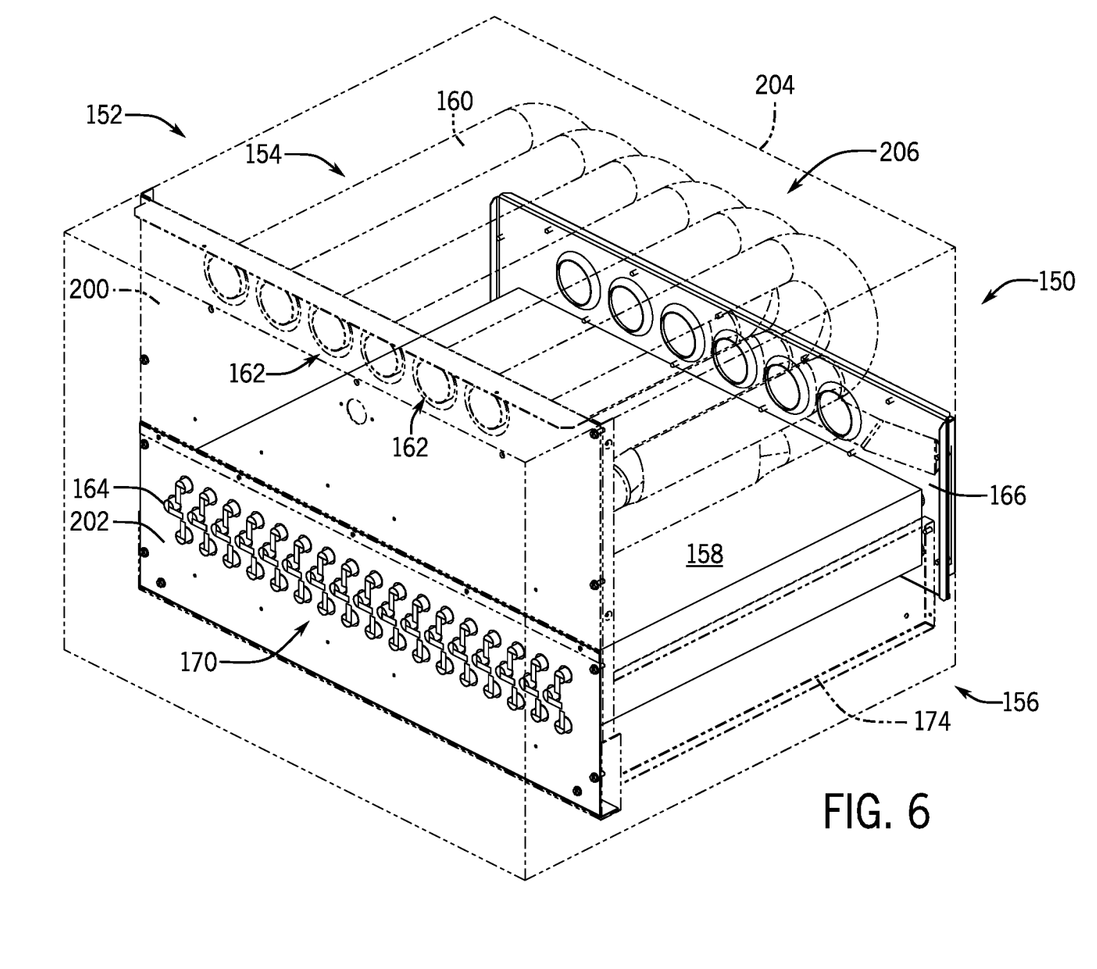
FIG. 6 is a perspective view of an embodiment of a heat exchanger system having separate vestibule panels, in accordance with an aspect of the present disclosure.

FIG. 6 is a perspective view of an embodiment of the heat exchanger system 150 that may be incorporated in the HVAC system 148. In the illustrated embodiment, the primary heat exchanger 154 is coupled to a first vestibule panel 200 (e.g., the set of primary tubes 160 may be coupled to the first vestibule panel 200 at the inlets 162) of the heat exchanger system 150. The secondary heat exchanger 158 is coupled to a second vestibule panel 202 (e.g., the set of secondary tubes 164 may be coupled to the second vestibule panel 202 at the outlets 170) of the heat exchanger system 150. The first vestibule panel 200 and the second vestibule panel 202 may be coupled to one or more components of the HVAC system 148, such as to an enclosure or a cabinet 204 of the HVAC system 148, to facilitate securement of the heat exchanger system 150 within the HVAC system 148. The first vestibule panel 200 and the second vestibule panel 202 may also be configured to couple to one another to block relative movement of different parts of the heat exchanger system 150, such as relative movement of the primary heat exchanger 154 relative to the secondary heat exchanger 158.

In certain embodiments, the first vestibule panel 200 and the second vestibule panel 202 may be individually coupled to and decoupled from the HVAC system 148 to enable improved accessibility of the HVAC system 148, such as during maintenance of the HVAC system 148. For example, in an installed configuration of the heat exchanger system 150 within the enclosure 204 (e.g., in an interior volume 206 of the enclosure 204 of the furnace containing the heat exchanger system 150), the first vestibule panel 200 and/or the second vestibule panel 202 may block accessibility to the interior volume 206 from another volume or section of the HVAC system 148. The second vestibule panel 202 may be decoupled from the first vestibule panel 200 and from the set of secondary tubes 164 without removing the first vestibule panel 200 from the HVAC system 148 to enable access to the interior volume 206 (e.g., access to the set of secondary tubes 164). Moreover, the set of primary tubes 160 may remain coupled to the first vestibule panel 200 within the enclosure 204, and/or the set of secondary tubes 164 may remain coupled to the set of primary tubes 160 within the enclosure 204 during removal of the second vestibule panel 202. In this manner, access to the interior volume 206 (e.g., the set of secondary tubes 164) of the HVAC system 148 may be enabled by decoupling the second vestibule panel 202 without removing or otherwise modifying other components of the heat exchanger system 150, thereby improving the ease of access to the interior volume 206 of the HVAC system 148. In further embodiments, other components of the heat exchanger system 150, such as the set of secondary tubes 164, the baffle 174, and/or the set of primary tubes 160, may also be decoupled from the HVAC system 148 after decoupling and removing the second vestibule panel 202 from the HVAC system 148 to further increase accessibility to the HVAC system 148. For instance, removal of the second vestibule panel 202 may form a void or space between the interior volume 206 of the HVAC system 148 and an adjacent volume or section, and other the components of the heat exchanger system 150 may be removed from the interior volume 206 via the void.

Additionally or alternatively, the first vestibule panel 200 may be decoupled from the second vestibule panel 202 and from the set of primary tubes 160 without removing the second vestibule panel 202 from the HVAC system 148 to enable access to the interior volume 206 of the HVAC system 148. In such embodiments, the set of secondary tubes 164 may remain coupled to the second vestibule panel 202 in the enclosure 204, and/or the set of primary tubes 160 may remain coupled to the set of secondary tubes 164 in the enclosure. Thus, access to the interior volume 206 of the HVAC system 148 may be enabled by decoupling the first vestibule panel 200 without removing or modifying other components of the heat exchanger system 150. In further embodiments, other components of the heat exchanger system 150 may also be decoupled from the HVAC system 148 after decoupling and removing the first vestibule panel 200 from the HVAC system 148, such as via a void formed between the interior volume 206 of the HVAC system 148 and an adjacent volume upon removal of the first vestibule panel 200. In any case, the individual removability of the first vestibule panel 200 and the second vestibule panel 202 may improve the ease of disassembly of the heat exchanger system 150 and thereby improve accessibility of the HVAC system 148.

To this end, the first vestibule panel 200 and the second vestibule panel 202 may be removably coupled to one another and/or to the HVAC system 148, such as via fasteners, in order to facilitate coupling and decoupling of the first vestibule panel 200 and the second vestibule panel 202 to and from one another and/or to and from the HVAC system 148. Other components of the heat exchanger system 150 may also be removably coupled to one another. By way of example, fasteners may be used to couple the set of primary tubes 160, the set of secondary tubes 164, the end plate 166, the cover 168, the baffle 174, and/or the baffle 176 to one another to facilitate assembly and disassembly of the heat exchanger system 150.

As discussed herein, operation of the heat exchanger system 150 may cause the formation of liquid condensate, such as within the secondary heat exchanger 158 and/or within the primary heat exchanger 154, and flow of the condensate through the secondary heat exchanger 158. For this reason, the heat exchanger system 150 may be arranged to block the condensate from impacting operation of the heat exchanger system 150. By way of example, components of the secondary heat exchanger section 156, such as the set of secondary tubes 164, the baffle 174, and/or the second vestibule panel 202, may be made of stainless steel, chromium, and/or another suitable (e.g., corrosion resistant) material to block effects of the condensate on the structural integrity and/or performance of the components. In certain embodiments, the condensate may be less likely to contact components of the primary heat exchanger section 152 during operation of the heat exchanger system 150 (e.g., due to formation of the condensate within the secondary heat exchanger section 156 downstream of the primary heat exchanger section 152). For this reason, the components of the primary heat exchanger section 152, such as the set of primary tubes 160, the baffle 176, and/or the first vestibule panel 200, may be made of a suitable material (e.g., carbon steel, rolled steel, galvanized steel) having less corrosion resistance than the material utilized to form components of the secondary heat exchanger section 156. Indeed, the components of the primary heat exchanger section 152 may be made of a different material, such as a less expensive material, than that of the components of the secondary heat exchanger section 156. Further, the components of the secondary heat exchanger section 156 may be sized and/or the components of the primary heat exchanger section 152 may be positioned to block the condensate formed in the secondary heat exchanger 158 from contacting the components of the primary heat exchanger section 152. For instance, the second vestibule panel 202 may be sized to position the first vestibule panel 200 at a sufficient distance offset from the set of secondary tubes 164 to avoid flow of condensate onto the first vestibule panel 200 (e.g., from the second vestibule panel 202). As such, the heat exchanger system 150 may limit an impact of condensate on various components and also limit a cost associated with the manufacture, assembly, and/or installation of the heat exchanger system 150.

Figure 7:
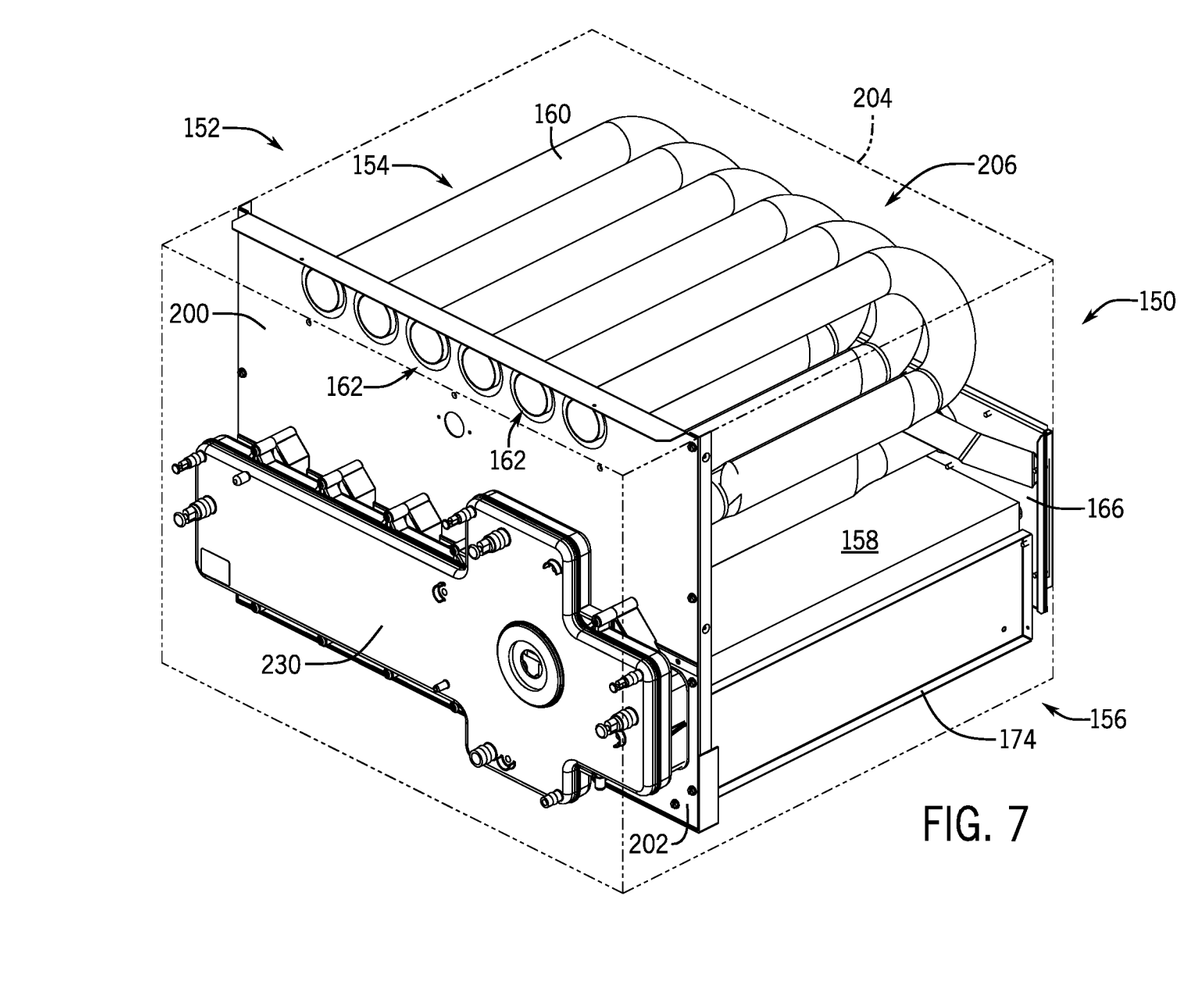
FIG. 7 is a perspective view of an embodiment of a heat exchanger system having separate vestibule panels, in accordance with an aspect of the present disclosure.

FIG. 7 is a perspective view of an embodiment of the heat exchanger system 150 that may be incorporated in the HVAC system 148. The illustrated heat exchanger system 150 includes a drain trap assembly 230 coupled to the second vestibule panel 202, such as at a side of the second vestibule panel 202 opposite the side to which the secondary heat exchanger 158 is coupled. The drain trap assembly 230 may receive condensate formed during operation of the heat exchanger system 150. For instance, the drain trap assembly 230 may be fluidly coupled to the set of secondary tubes 164 and/or the set of primary tubes 160 via drain lines and may receive condensate formed in the combustion products during operation of the heat exchanger system 150, such as from the cooling of the combustion products directed through the set of secondary tubes 164. Indeed, the drain lines may be fluidly coupled to any suitable section of the set of primary tubes 160 and/or the set of secondary tubes 164, such as adjacent to the outlets 170 and/or to the end plate 166. Further, the drain trap assembly 230 may block air from flowing into the set of primary tubes 160 of primary heat exchanger 154 and/or into the set of secondary tubes 164 the secondary heat exchanger 158 (e.g., via the drain lines) and/or may block gas (e.g., combustion products) from flowing out of the primary heat exchanger 154 and/or from the secondary heat exchanger 158 (e.g., via the drain lines). As an example, the drain trap assembly 230 may collect fluid that blocks air from flowing through a volume of the drain trap assembly 230 (e.g., into and/or out of the set of primary tubes 160 and/or the set of secondary tubes 164).

The illustrated drain trap assembly 230 may include an internal drain trap that is positioned within the enclosure 204 in the interior volume 206 in the installed configuration of the heat exchanger system 150. In some embodiments, the assembly of the drain trap assembly 230 and the second vestibule panel 202 may be collectively removed to enable access into the HVAC system 148 (e.g., the heat exchanger system 150). That is, the second vestibule panel 202 may be decoupled from the HVAC system 148 to remove both the second vestibule panel 202 and the drain trap assembly 230 from the HVAC system 148 without decoupling the second vestibule panel 202 and the drain trap assembly 230 from one another. In additional or alternative embodiments, the drain trap assembly 230 may be decoupled from the second vestibule panel 202 to facilitate decoupling of the second vestibule panel 202 from the HVAC system 148, such as by exposing a surface of the second vestibule panel 202 to facilitate decoupling of the second vestibule panel 202 from the HVAC system 148. For example, the drain trap assembly 230 may be removably coupled to the second vestibule panel 202 via fasteners. In further embodiments, another component (e.g., a fan, a drain line) may be directly or indirectly coupled to the second vestibule panel 202, and the other component may be easily removed from the HVAC system 148 via the second vestibule panel 202 to enable access to internal components of the HVAC system 148.

Figure 8:
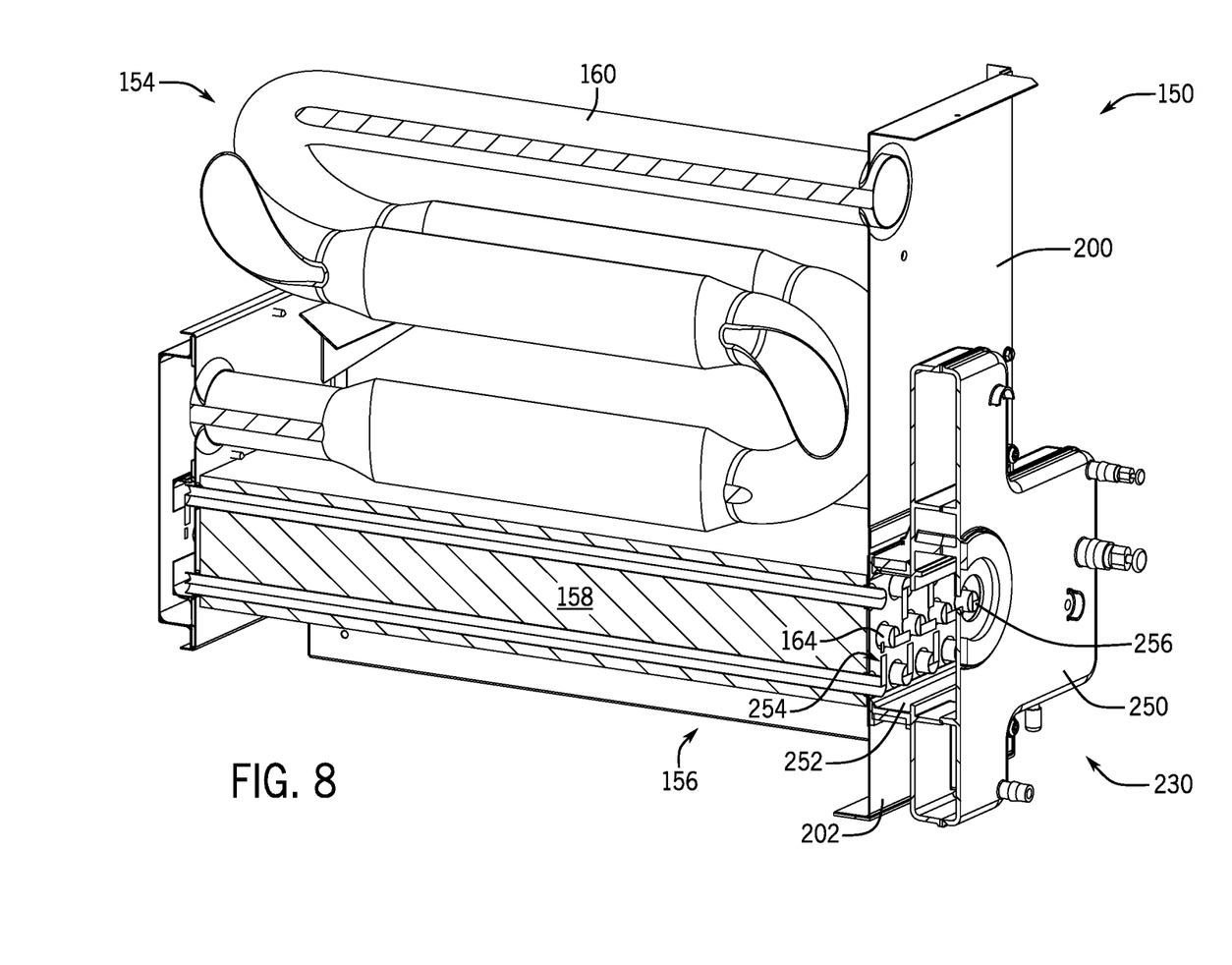
FIG. 8 is a perspective cross-sectional view of an embodiment of a heat exchanger system having separate vestibule panels and a drain trap assembly coupled to one of the vestibule panels, in accordance with an aspect of the present disclosure.

FIG. 8 is a perspective cross-sectional view of an embodiment of the heat exchanger system 150 including the drain trap assembly 230 coupled to the second vestibule panel 202. The illustrated drain trap assembly 230 may be directly mounted to the second vestibule panel 202. For example, the drain trap assembly 230 may include a drain trap 250 and an adapter 252 coupling the drain trap 250 to the second vestibule panel 202. The adapter 252 may be directly secured to the second vestibule panel 202 (e.g., via fasteners) without the use of an intermediate component. Indeed, the drain trap assembly 230 may be directly in contact with the second vestibule panel 202 without subjecting the second vestibule panel 202 to degradation from condensate. For example, the drain trap assembly 230 (e.g., the drain trap 250 and the adapter 252) may be formed from materials resistant to degradation via condensate. Thus, there may be a fewer number of components implemented in the heat exchanger system 150. As such, a complexity and/or a cost associated with manufacture of the heat exchanger system 150 may be reduced.

In addition, the drain trap assembly 230 (e.g., the adapter 252) may form a cavity 254. The direct coupling between the drain trap assembly 230 and the second vestibule panel 202 may enable the set of secondary tubes 164 to extend into the cavity 254 and toward the drain trap 250. A fan may direct combustion products through the heat exchanger system 150 via the drain trap assembly 230. For instance, the drain trap 250 may include an opening 256, and the fan may induce the flow of combustion products out of the set of primary tubes 160 and the set of secondary tubes 164 via the opening 256. The extension of the set of secondary tubes 164 into the cavity 254 may enable the fan to operate more efficiently, such as to increase the flow rate of the combustion products through the heat exchanger system 150 and/or reduce an amount of power drawn by the fan, thereby increasing an efficiency of the heat exchanger system 150 to heat the supply air flow. For example, the positioning of the set of secondary tubes 164 within the cavity 254 and toward the drain trap 230 may reduce a pressure loss associated with the flow of combustion products induced by the fan. In this manner, the direct coupling between the second vestibule panel 202 and the drain trap assembly 230 may improve a performance of the heat exchanger system 150.

The present disclosure may provide one or more technical effects useful in the operation of an HVAC system. For example, a heat exchanger system of the HVAC system may include tubes through which combustion products are directed and across which an air flow is directed to exchange heat with the combustion products. Indeed, the heat exchanger may include a first tube (e.g., of a primary heat exchanger) configured to receive the combustion products, as well as a second tube (e.g., of a secondary heat exchanger) configured to receive the combustion products from the first tube. The first tube may be configured to couple to a first vestibule panel of the heat exchanger system, and the second tube may be configured to couple to a second vestibule panel of the heat exchanger system. During operation, condensate may be formed within a part of the heat exchanger system, such as within the second tube. The second vestibule panel may be made of a material that is not substantially impacted by contact with the condensate, such as a corrosion resistant material. Further, the second vestibule panel may be sized such that contact between the condensate and the first vestibule panel is substantially avoided. In this manner, both the first vestibule panel and the second vestibule panel may not be impacted by the formation of the condensate within the heat exchanger system, thereby improving a structural integrity of the HVAC system. In addition, the first vestibule panel and the second vestibule panel may be individually removable from the heat exchanger system to increase accessibility of the HVAC system. For example, the second vestibule panel may be removed without removing or modifying other components of the heat exchanger system to enable access to an interior volume of the heat exchanger system. Thus, the features disclosed herein may improve the ease of access to the interior volume of the heat exchanger system.

Further, a drain trap assembly may be directly coupled to the second vestibule panel without use of an additional (e.g., an intermediate or intervening) component, thereby reducing a number of components, a complexity, and/or a cost associated with manufacture of the heat exchanger system. The drain trap assembly may also include a cavity into which the second tube may extend. A fan may direct combustion products to flow through the heat exchanger system, and the positioning of the second tube within the cavity may reduce a pressure loss associated with the flow of combustion products through the heat exchanger system, thereby increasing an efficiency of the fan. Thus, the arrangement of the drain trap assembly with the second vestibule panel may improve a performance of the heat exchanger system to heat a supply air flow. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A condensing heat exchanger system, the condensing heat exchanger system comprising:
   a first tube configured to receive a conditioning fluid;
   a second tube configured to receive the conditioning fluid from the first tube;
   a first vestibule panel coupled to the first tube;
   a second vestibule panel coupled to the second tube, wherein the first vestibule panel and the second vestibule panel are coupled to one another, the first vestibule panel and the second vestibule panel are aligned with each other in a direction of an air flow through the condensing heat exchanger system, the first vestibule panel comprises a first material, and the second vestibule panel comprises a second material;
   an end plate coupled to the first tube and the second tube, wherein the end plate is disposed opposite the first vestibule panel and the second vestibule panel relative to the first tube and the second tube;
   an end cover coupled to the end plate, wherein the end plate and the end cover cooperatively define a compartment configured to receive the conditioning fluid from the first tube and direct the conditioning fluid to the second tube; and
   a drain trap assembly directly coupled to the second vestibule panel and configured to collect condensate.

2. The condensing heat exchanger system of claim 1, wherein the first material comprises stainless steel, and the second material comprises carbon steel.

3. The condensing heat exchanger system of claim 1, wherein the first vestibule panel and the second vestibule panel are removably coupled to one another.

4. The condensing heat exchanger system of claim 1, wherein the first tube has a first cross sectional area, the second tube has a second cross sectional area, and the first cross sectional area is greater than the second cross sectional area.

5. The condensing heat exchanger system of claim 1, wherein the drain trap assembly comprises an internal drain trap and an adapter coupled to the internal drain trap, wherein the adapter is in direct contact with the second vestibule panel and the internal drain trap.

6. The condensing heat exchanger system of claim 1, wherein the first tube defines multiple passes, and the second tube defines a single pass.

7. A furnace, comprising:
   a first heat exchanger tube and a second heat exchanger tube fluidly coupled to one another;
   a first vestibule panel configured to couple to the first heat exchanger tube;
   a second vestibule panel configured to couple to the second heat exchanger tube, wherein the first vestibule panel and the second vestibule panel are each removably coupled to and individually removable from the furnace, the first vestibule panel and the second vestibule panel are aligned with each other in a direction of an air flow through the furnace, the first vestibule panel is formed from a first material, the second vestibule panel is formed from a second material different than the first material, and the second material is more corrosion resistant than the first material; and
   a drain trap assembly directly mounted to the second vestibule panel and configured to collect liquid formed within the furnace during operation of the furnace, wherein the drain trap assembly forms a cavity, and the second heat exchanger tube extends into the cavity.

8. The furnace of claim 7, wherein the first heat exchanger tube is configured to receive combustion products from a heat source and is configured to direct the fluid toward the second heat exchanger tube.

9. The furnace of claim 8, comprising:
   an end plate coupled to a first outlet of the first heat exchanger tube and an inlet of the second heat exchanger tube; and
   an end cover coupled to the end plate,
   wherein the end plate and the end cover cooperatively define a compartment configured to receive the fluid from the first heat exchanger tube and direct the fluid to the second heat exchanger tube.

10. The furnace of claim 7, comprising an enclosure, wherein the drain trap assembly, the first heat exchanger tube, the second heat exchanger tube, the first vestibule panel, and the second vestibule panel are disposed within the enclosure.

11. The furnace of claim 7, wherein the first vestibule panel and the second vestibule panel are removably coupled to one another.

12. The furnace of claim 7, comprising a blower configured to direct the air flow sequentially across the second heat exchanger tube and the first heat exchanger tube.

13. A heat exchanger system, comprising:
    a first heat exchanger section, comprising:
        a first vestibule panel; and
        a first tube coupled to the first vestibule panel at an inlet of the first tube, wherein the first tube is configured to direct a fluid therethrough and transfer heat from the fluid to an air flow directed through the heat exchanger system;
    a second heat exchanger section, comprising:
        a second vestibule panel; and
        a second tube coupled to the second vestibule panel at an outlet of the second tube, wherein the second tube is fluidly coupled to the first tube, the second tube is configured to receive the fluid from the first tube, to direct the fluid therethrough, and to transfer heat from the fluid to the air flow directed through the heat exchanger system, the first vestibule panel and the second vestibule panel are separate components, the first vestibule panel and the second vestibule panel are coupled to one another and are aligned with each other in a direction of the air flow directed through the heat exchanger system, the first vestibule panel is formed from a first material, the second vestibule panel is formed from a second material different than the first material, and the second material is more corrosion resistant than the first material; and
    a drain trap assembly coupled to the second vestibule panel and forming a cavity, wherein the second tube of the second heat exchanger section extends into the cavity.

14. The heat exchanger system of claim 13, wherein the first vestibule panel is removably coupled to the first heat exchanger section, the second vestibule panel is removably coupled to the second heat exchanger section, and the first vestibule panel and the second vestibule panel are individually removably coupled to the heat exchanger system.

15. The heat exchanger system of claim 13, comprising an enclosure, wherein the first heat exchanger section and the second heat exchanger section are disposed within the enclosure, and the drain trap assembly comprises a drain trap disposed within the enclosure.

16. The heat exchanger system of claim 13, wherein the second vestibule panel is configured to decouple from the second heat exchanger section while the first vestibule panel remains coupled to the first heat exchanger section.

17. The heat exchanger system of claim 16, wherein the first vestibule panel is configured to decouple from the first heat exchanger section while the second vestibule panel remains coupled to the second heat exchanger section.

\* \* \* \* \*